(12) United States Patent
Morrissey et al.

(10) Patent No.: US 7,196,784 B2
(45) Date of Patent: Mar. 27, 2007

(54) METHOD AND APPARATUS FOR OPTICAL CORRECTION OF A LASER BEAM

(75) Inventors: Kevin Marc Morrissey, Xenia, OH (US); Michael A. Stickelman, Vandalia, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 11/125,474

(22) Filed: May 10, 2005

(65) Prior Publication Data
US 2006/0256323 A1    Nov. 16, 2006

(51) Int. Cl.
*G01B 11/26* (2006.01)
(52) U.S. Cl. .............. 356/139.05; 356/139.01
(58) Field of Classification Search ............ 356/139.05
See application file for complete search history.

(56) References Cited

U.S. PATENT DOCUMENTS

| | | |
|---|---|---|
| 3,897,637 A | 8/1975 | Genho |
| 4,062,634 A | 12/1977 | Rando et al. |
| 5,045,679 A | 9/1991 | Suzuki et al. |
| 5,144,487 A | 9/1992 | Hersey |
| 5,500,524 A | 3/1996 | Rando |
| 5,594,993 A | 1/1997 | Tager et al. |
| 5,959,789 A * | 9/1999 | Rando ................... 359/822 |
| 6,072,581 A * | 6/2000 | Stephenson et al. ........ 356/521 |
| 2002/0144415 A1 | 10/2002 | Dang et al. |

FOREIGN PATENT DOCUMENTS

JP    2004302055    10/2004

* cited by examiner

*Primary Examiner*—Thomas H. Tarcza
*Assistant Examiner*—Luke D. Ratcliffe
(74) *Attorney, Agent, or Firm*—Dinsmore & Shohl LLP (57) ABSTRACT

A laser beam transmitter and a method of calibrating such a transmitter result in a beam of laser light that is projected in a desired direction with respect to a transmitter body. The transmitter and a beam target are positioned such that a properly calibrated beam will illuminate a desired point on the target, such as for example the target center. The transmitter is activated and the offset of the point illuminated on the target from the target center measured. A plurality of optical wedge correction elements having varying wedge angles is provided, and the appropriate one of these optical wedge correction elements that will correct for the measured offset is selected. The selected optical wedge correction element is positioned in the transmitter body in the path of the beam. The optical wedge correction element is rotated until the beam is substantially aligned to illuminate the target center. The optical wedge element is then affixed in place in the transmitter body.

12 Claims, 6 Drawing Sheets

METHOD AND APPARATUS FOR OPTICAL CORRECTION OF A LASER BEAM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a laser transmitter and, more particularly, to a laser transmitter having a simple, quickly implemented arrangement for correcting for initial misalignment of the beam or beams produced by the laser transmitter. The present invention is particularly well suited for correction of optical errors in transmitters of the type that produce one or more stationary reference beams.

Simple transmitters of this type have been used in construction to project one, two, three, or more beams of visible light for alignment purposes. One such transmitter is shown in U.S. Pat. No. 3,897,637, issued Aug. 5, 1975 to Genho. A beam from a laser source is collimated and then split into three beams that precisely define a three-dimensional reference coordinate system.

A similar transmitter is shown in U.S. Pat. No. 5,500,524, issued Mar. 10, 1996, to Rando. In the Rando patent, a beam from a laser diode is split by appropriate optics into three orthogonal beams. Compact battery-operated laser projectors of this type have found wide use in the construction industry in performing alignment operations. For example, a visible beam of light projects a straight line in space, and this visible beam can be used to locate building references. A leveled or plumb beam of light can be used to set the level or plumb directions of building elements such as floors, walls, and columns. In many applications a small-diameter visible laser beam replaces a string line. The beam strikes an object producing a small spot of light. The center of the spot can then be marked with a pencil as needed.

Typically, the transmitters or projectors of this type use a single diode light source and divide or split the light beam with optics. For example in U.S. Pat. No. 5,144,487, issued Sep. 1, 1992, to Hersey, two co-linear beams are generated using a beam splitter and a mirror. Transmitters of this type require precise alignment of optical elements to achieve the desired level of accuracy.

Several approaches to adjusting or aligning the output beam of a laser projector or transmitter are shown in U.S. Pat. No. 5,959,789, issued Sep. 28, 1999, to Rando. In FIG. 3 of the Rando patent, two optical wedges or prisms are shown as mounted in the output path of a beam. The two wedges can be rotated independently about an axis aligned with the laser beam. The wedges refract the beam in two directions and, if properly set, can effect varying amounts of beam alignment correction in any direction. The Rando patent also shows using a single optical element comprising a low magnification telescope that can be rotated in a semi-spherical seat to steer a beam in a desired direction and correct beam misalignment. The Rando patent teaches adhesively affixing the low magnification telescope in place when the desired correction is obtained. While effecting correction, the mounting and the telescope are somewhat complicated mechanically. A need exists for a simple, inexpensive way to compensate a reference beam transmitter for slight errors introduced during manufacture and assembly so that the final transmitter is inexpensive, rugged, and accurate.

SUMMARY OF THE INVENTION

These needs are met by a method of calibrating a laser beam transmitter according to the present invention such that a beam of laser light produced by the transmitter is projected in a desired direction with respect to a transmitter body. The transmitter and a beam target are positioned such that a properly calibrated beam will illuminate a desired point on the target, such as for example the target center. The transmitter is activated and the offset is measured between the point illuminated on the target and the target center. A plurality of optical wedge correction elements having varying wedge angles is provided. The appropriate one of these optical wedge correction elements that will correct for the measured offset is then selected. The selected optical wedge correction element is positioned in the transmitter body in the path of the beam. The optical wedge correction element is then rotated until the beam is substantially aligned to illuminate the target center, and the optical wedge element is fixed in place in the transmitter body.

The step of fixing the optical wedge element in place in the transmitter body may comprise the step of adhesively fixing the optical wedge element in place. The step of providing a plurality of optical wedge correction elements having varying wedge angles may comprise the step of providing a plurality of optical wedge correction elements, each element having a generally cylindrical shape and defining first and second flat surfaces. The angles included between the first and second surfaces of the plurality of optical wedge correction elements vary from element to element. The step of activating the transmitter and measuring the offset of the point illuminated on the target from the target center may include the step of activating the transmitter and measuring the offset of the point illuminated on the target from the target center without regard to the direction of offset, that is, the azimuth and altitude. The step of providing a plurality of optical wedge correction elements having varying wedge angles may comprise the step of providing a plurality of optical wedge correction elements having deflection angles that vary in increments that are dictated by manufacturing tolerances and the accuracy of correction desired. In one instance optical correction elements having deflection angles that vary in increments of 0.25 minutes were found acceptable. The step of positioning the transmitter and a beam target such that a properly calibrated beam will illuminate the target center includes the step of positioning the transmitter body by placing it in contact with reference surfaces or reference points.

A laser beam transmitter according to the present invention includes a transmitter body, and a laser beam source in the body capable of generating a laser beam. The body defines a pair of reference surfaces. An optical wedge correction element is positioned in the body in the path of the laser beam. The optical wedge correction element has an appropriate wedge angle and orientation for deflecting the beam, such that the beam is substantially properly aligned with respect to the reference surface. An adhesive fixes the optical wedge correction element in position in the body.

The adhesive may secure the correction element to the body. Additionally, the optical wedge correction element in the body in the path of the laser beam may be generally cylindrical with non-parallel upper and lower surfaces defining a wedge there between.

Accordingly it is an object of the present invention to provide a laser transmitter and method in which laser beam misalignments may be corrected in a straightforward, inexpensive manner during the manufacturing process. Other objects and advantages of the invention will be apparent from the following description, the accompanying drawings, and the appended claims.

DETAILED DESCRIPTION OF THE INVENTION

Figure 1:
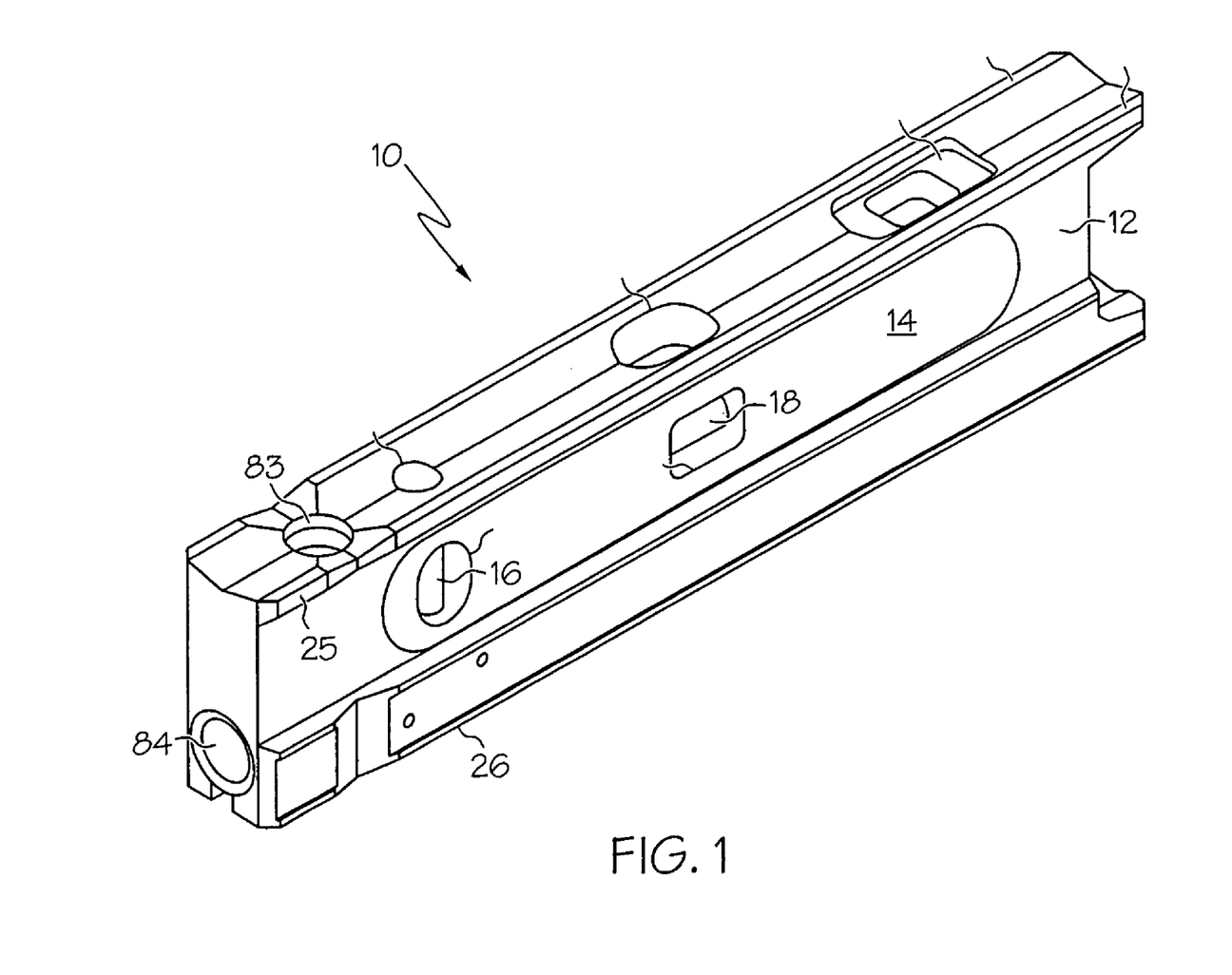
FIG. 1 is a perspective view showing a laser beam transmitter and level device according to the present invention.
Figure 2:
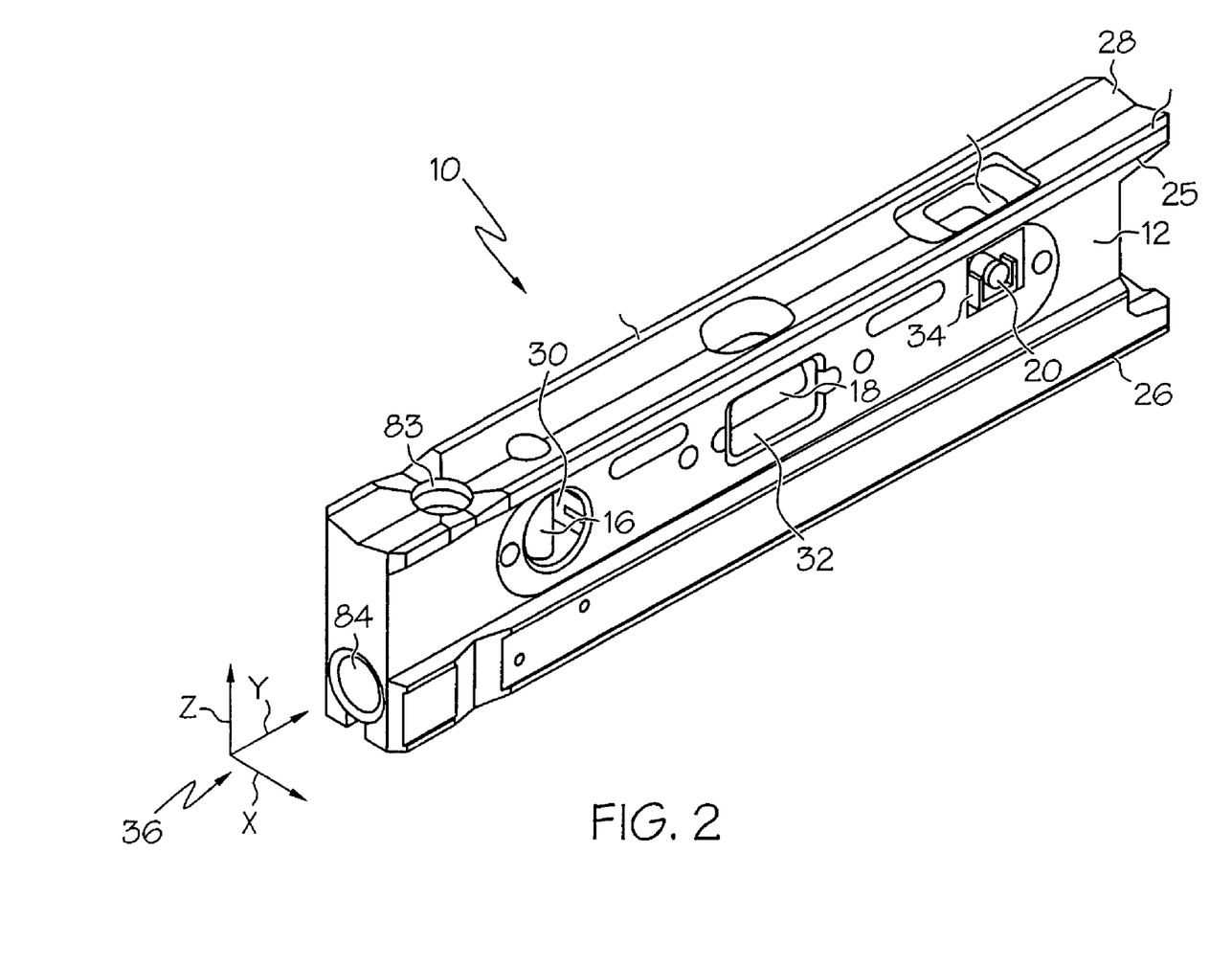
FIG. 2 is a perspective view of the device of FIG. 1 with a cover plate removed.
Figure 3:
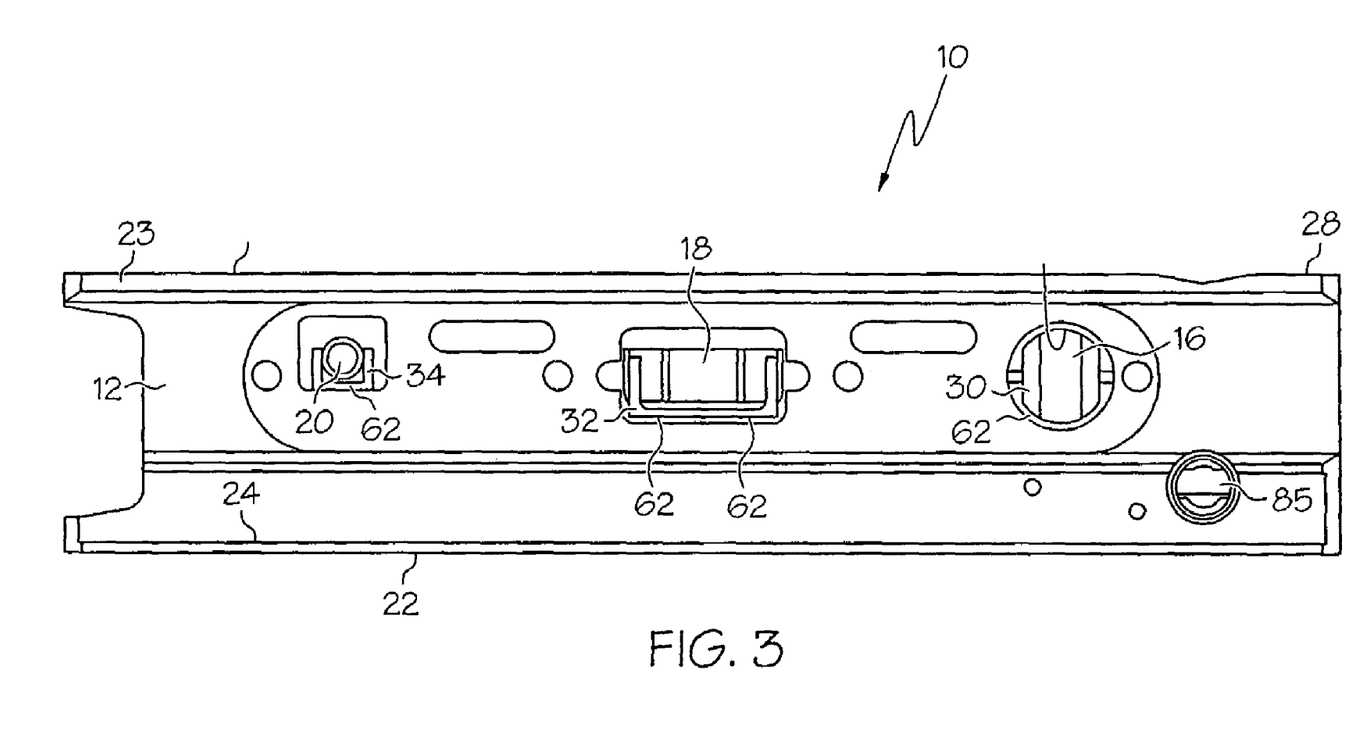
FIG. 3 is a side view of the device of FIG. 1 with a cover plate removed.

Reference is now made to FIGS. 1–3 of the drawings, showing a device 10, constructed in accordance with the present invention, which includes a laser beam transmitter and a level arrangement. The device 10 includes a transmitter body 12 having a pair of cover plates 14 (only one of which is shown) affixed to either side.

FIGS. 2 and 3 show the device 10 with the cover plates 14 removed so as to reveal interior structure for mounting and calibrating level vials 16, 18, and 20. It will be noted that FIGS. 2 and 3 show opposite sides of the device 10. The body 12 defines reference surfaces 22, 23, 24, 25, 26, and 28. These surfaces may perform reference functions when the device 10 is utilized either for leveling or for projecting reference beams.

As is well known, the level vials 16, 18, and 20 each have a transparent hollow body that defines a sealed cavity. The cavities are partially filled with fluid 21, so that bubbles of air are also defined within the cavities. The bubbles naturally float at the tops of the cavities and provide an indication of the orientations of the level vials.

The level vials 16, 18, and 20 are intended to be oriented, or calibrated, precisely with respect to the reference surfaces 22, 23, 24, 25, 26, and 28. A vial carrier is provided on the body 12 for holding each of the level vials 16, 18, and 20. More specifically, level vial 16 is held by vial carrier 30, level vial 18 is held by vial carrier 32, and level vial 20 is held by vial carrier 34. Each vial carrier holds its associated level vial such that the level vial may be calibrated by rotation about a pair of orthogonal adjustment axes, each of the orthogonal adjustment axes being perpendicular to the direction of elongation of the level vial. For example, with reference to axes 36 shown in FIG. 2, vial 16, extending parallel to the Z axis, may be rotated about adjustment axes parallel to the X and Y axes. Vial 18, extending parallel to the Y axis, may be rotated about adjustment axes parallel to the X and Z axes. And finally, vial 20, extending parallel to the X axis, may be rotated about adjustment axes parallel to the Y and Z axes.

During the assembly and calibration process, after the level vials are calibrated, adhesive is used to fix the position of each level vial 16, 18, 20 with respect to its vial carrier 30, 32, 34, and the position of each vial carrier 30, 32, 34 with respect to the body 12, and with respect to reference surfaces on the body 12. By reference surfaces is meant surfaces or surface points that collectively define the basis for orienting the transmitter when the surfaces or surface points are brought into contact with surfaces which are to be measured or otherwise marked or assessed.

The laser beam transmitter includes a source of light, such as for example a light emitting laser diode source, that transmits beams of light along and parallel to all three of the axes X, Y, and Z, indicated at 36 in FIG. 2, of the body 12. More specifically, reference beams are projected vertically and horizontally in two orthogonal directions from openings 83, 84, and 85, respectively.

Figure 4:
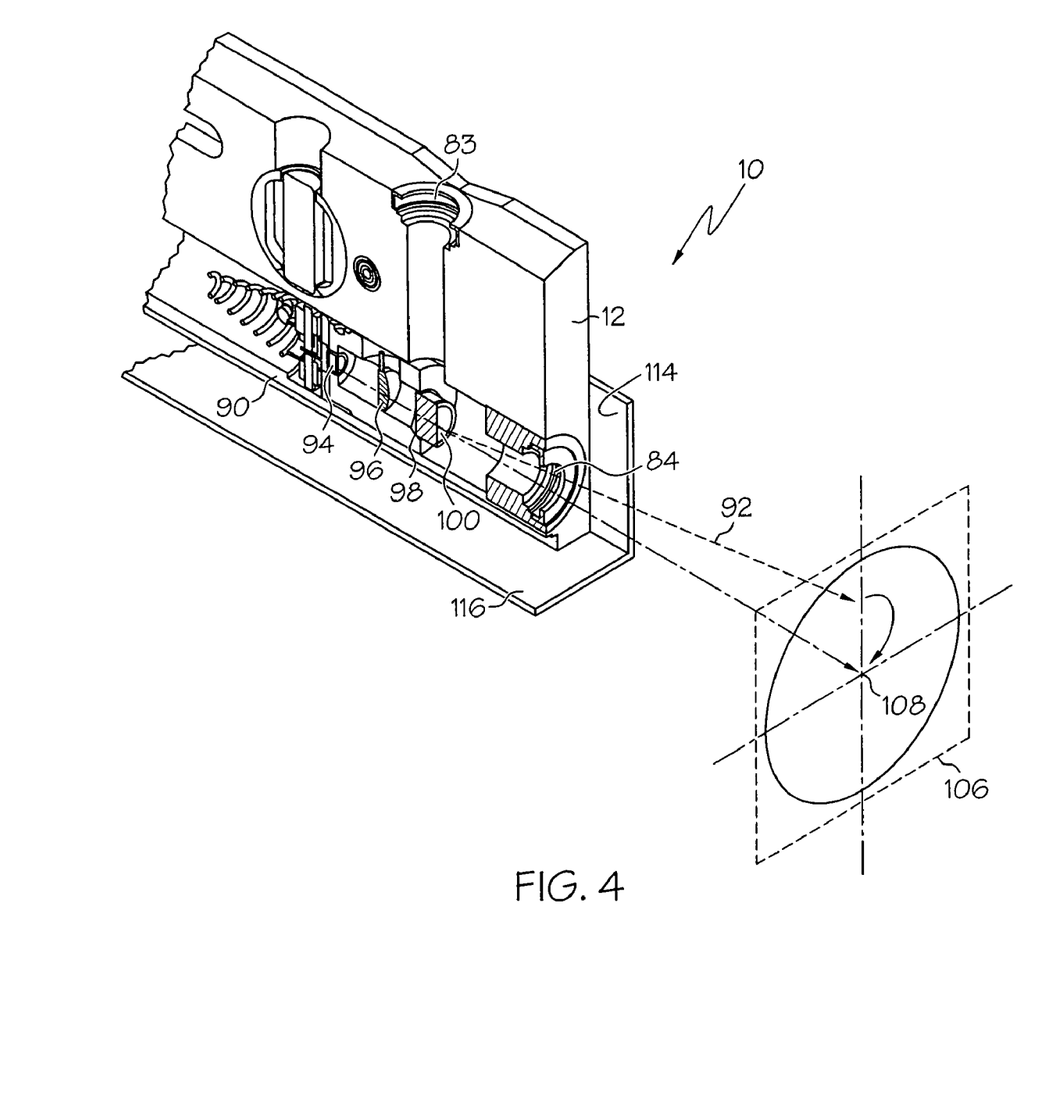
FIG. 4 is a view of a portion of the device of FIG. 1, with portions broken away, directing a laser beam at a target during calibration.

As seen in FIG. 4, a laser beam source 90, capable of generating a laser beam 92, is provided in the body 12. The laser beam source 90 includes a laser diode 94, a collimating lens 96 which collimates the laser beam from the diode 94, a mask 98 which permits three portions of the collimated beam to pass through, an optical beam splitter 100 which splits and redirects the light from the diode into three orthogonal beams. One such beam 92 emerges from the body 12 through opening 84. The other two beams emerge from the body 12 through openings 83 and 85 (FIG. 3).

It will be appreciated that the alignment of the beam 92, and the other beams produced by the transmitter, with respect to the body 12 of the transmitter could vary considerably in dependence upon the geometry and alignment of the component elements making up the laser beam source 90. The present invention compensates for whatever error initially by means of an optical wedge correction element 102 (FIGS. 5A and 5B) in the body 12 in the path of the laser beam 92. The optical wedge correction element 102 has an appropriate wedge angle Φ and orientation for refracting the beam by an angle θ such that the beam is substantially properly aligned with respect to the reference surfaces on the body 12, as indicated by the movement of the beam toward the center of the target. The transmitter includes an adhesive that fixes the optical wedge correction element 102 in position in opening 84. The adhesive secures the correction element 102 to the body 12 in opening 84 in the desired orientation.

Figure 5A:
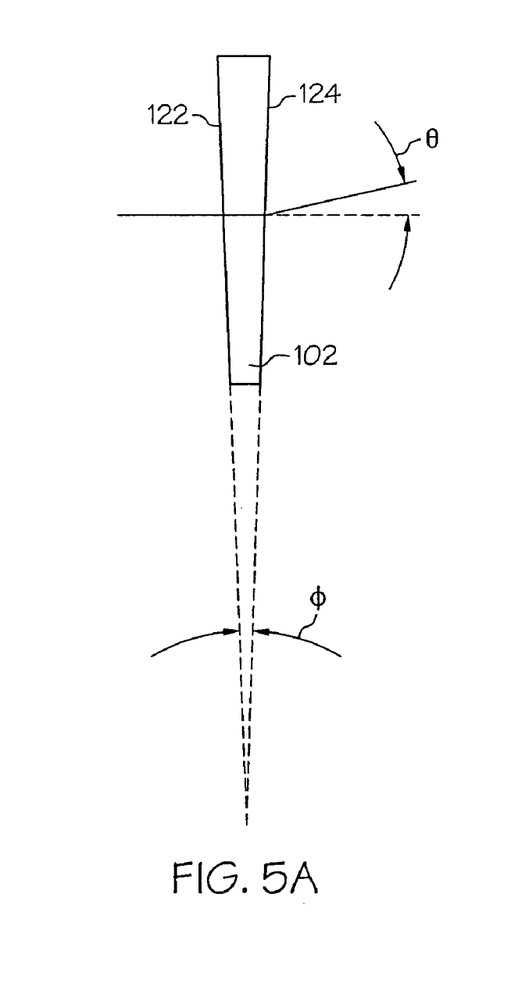
FIG. 5A is a side view of an optical correction wedge.
Figure 5B:
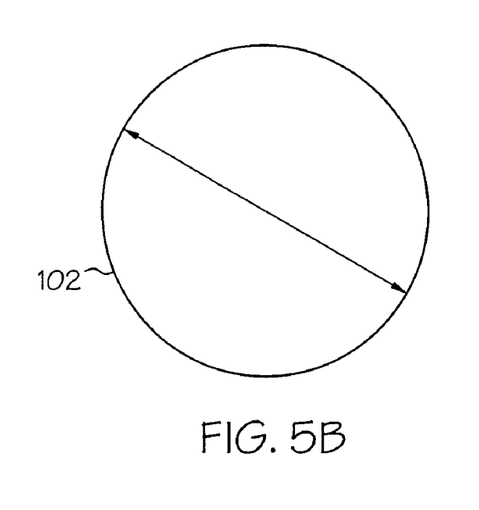
FIG. 5B is a plan view of the optical correction wedge of FIG. 5A, as seen looking left to right in FIG. 5A.

As will be noted from FIGS. 5A and 5B, the optical wedge correction element 102 is generally cylindrical, with non-parallel upper and lower surfaces 122 and 124 defining a wedge there between. As illustrated in FIG. 5A, a ray passing through correction element is refracted upward. It will be appreciate that by rotating the element 102, the refracted ray can be redirected in any desired direction. Thus the optical wedge correction element can be used to redirect the beam 92 in any needed direction.

According to the present invention, the laser beam transmitter is calibrated during manufacture by proper selection and orientation of optical wedge correction elements 102. To accomplish this, the transmitter 10 is positioned along with a beam target 106 such that a properly calibrated beam will illuminate the target center or other desired point 108. Next, the transmitter is activated and the offset 110 (between the point 112, which is illuminated on the target, and the target center 108) measured. A plurality of optical wedge correction elements 102 having varying wedge angles Φ are provided for the technician performing calibration. An optical wedge correction element appropriate to correct for the measured offset is selected from these wedge correction elements. Next the selected optical wedge correction element is positioned in the transmitter body in the path of the beam. The optical wedge correction element is then rotated until the beam is substantially aligned to illuminate the target center. Finally, the optical wedge element is affixed in place in the transmitter body.

Figure 6:
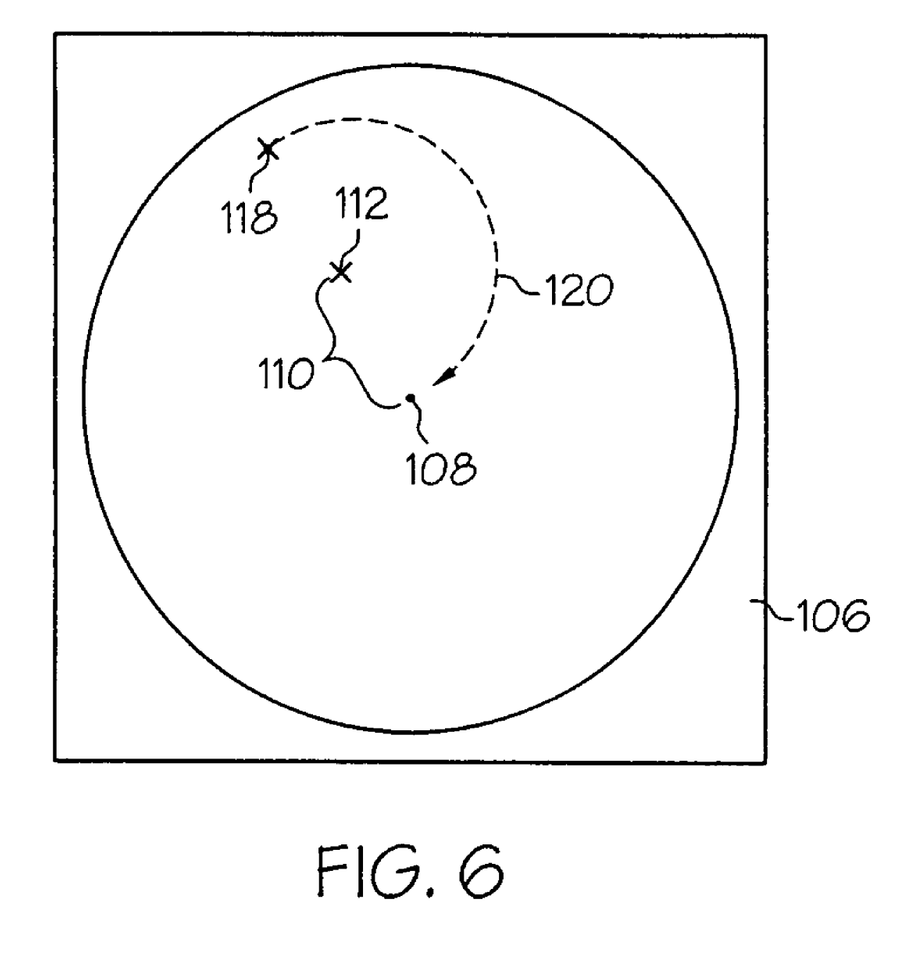
FIG. 6 is a plan view of a target used in calibration.

As seen in FIGS. 4 and 6, during calibration the transmitter 10 is positioned against a pair of reference surfaces 114 and 116 which are located in relation to target 106 such that a properly calibrated beam 92 from the transmitter 10 will illuminate a desired point 108 on the target. The transmitter 10 is then activated, illuminating a point 112 on the target 106. The offset 110 between points 108 and 112 is then measured. The magnitude of this offset 110, without regard to its direction in azimuth and altitude, provides an indication of the amount of correction needed, and therefore an indication of which of a plurality of optical wedge correction elements having various wedge angles is appropriate to correct for the measured error in beam position. Each of the correction elements is capable of deflecting a beam passing there through by a predetermined deflection angle. An optical wedge correction element 102 is selected from the plurality of optical wedge correction elements. The selected optical wedge correction element is then inserted into opening 84 in the body 12, in the path of the beam 92. The beam will be refracted by the selected element 102, resulting in a different point 118 on the target 106 being illuminated. Essentially, the displacement between points 112 and 118 should be approximately the same as the offset 110, but perhaps in a different direction. The optical wedge correction element 102 is then rotated, causing the point of illumination to move along circular track 120. This rotation is continued until the illumination point 118 is coincident with point 108 on the target 106. At this point, the laser beam is calibrated with respect to the registration surfaces of the transmitter. The optical wedge correction element 102 is affixed in place in the transmitter body by the application of adhesive to the edge of the element 102 and the transmitter body 12.

As indicated previously, a plurality of optical wedge correction elements 102, having varying wedge angles, are provided for use by the technician performing the calibration operation. In on case, it was found to be sufficient for correction accuracy to use a collection of wedge elements having deflection angles of between 0 minutes and 12.00 minutes, available in 0.25 minute increments. It will be appreciated, however, that the range of deflection angles and the incremental adjustments available between elements will be a function of the manufacturing tolerances and the desired accuracy of the corrected beam position. As may be noted in FIGS. 5A and 5B, each element 102 has a generally cylindrical shape, and defines flat first and second surfaces 122 and 124.

While certain representative embodiments and details have been shown for purposes of illustrating the invention, it will be apparent to those skilled in the art that various changes in the transmitter and method disclosed herein may be made without departing from the scope of the invention, which is defined in the appended claims.

What is claimed is:

1. A method of calibrating a laser beam transmitter such that a beam of laser light produced by the transmitter is projected in a desired direction with respect to a transmitter body, comprising the steps of:

positioning the transmitter and a beam target such that a properly calibrated beam will illuminate the target center, activating the transmitter and measuring the offset of the point illuminated on the target from the target center, providing a plurality of optical wedge correction elements having varying wedge angles, selecting an optical wedge correction element appropriate to correct for the measured offset, positioning the selected optical wedge correction element in the transmitter body in the path of said beam, rotating said optical wedge correction element until said beam is substantially aligned to illuminate said target center, and affixing said optical wedge element in place in said transmitter body.

2. The method of claim 1 in which the step of affixing said optical wedge element in place in said transmitter body comprises the step of adhesively affixing said optical wedge element in place.

3. The method of claim 1 in which the step of providing a plurality of optical wedge correction elements having varying wedge angles comprises the step of providing a plurality of optical wedge correction elements, each element having a generally cylindrical shape and defining flat first and second surfaces, the angles included between said first and second surfaces of said plurality of optical wedge correction elements varying from element to element.

4. The method of claim 1 in which the step of activating the transmitter and measuring the offset of the point illuminated on the target from the target center includes the step of activating the transmitter and measuring the offset of the point illuminated on the target from the target center without regard to the direction of offset in azimuth or altitude.

5. The method of claim 1 in which the step of providing a plurality of optical wedge correction elements having varying wedge angles comprises the step of providing a plurality of optical wedge correction elements having deflection angles that are vary in increments of 0.25 minutes.

6. The method of claim 1 in which the step of positioning the transmitter and a beam target such that a properly calibrated beam will illuminate the target center includes the step of positioning the transmitter body by placing it in contact with reference surfaces.

7. A method of calibrating a laser beam transmitter having a transmitter body such that a beam of laser light produced by the transmitter is projected in a desired direction with respect to the transmitter body, comprising the steps of:

positioning the transmitter against a pair of reference surfaces, and positioning a beam target such that a properly calibrated beam from the transmitter will illuminate a desired point on the target, activating the transmitter and measuring the offset of the point illuminated on the target by the beam from the desired point on the target, providing a plurality of optical wedge correction elements having various wedge angles, each of said correction elements capable of deflecting a beam passing there through by a predetermined deflection angle, selecting an optical wedge correction element from said plurality of optical wedge correction elements, the selected optical wedge correction element being chosen to correct for the measured offset of the beam from the desired point on the target, positioning the selected optical wedge correction element in the transmitter body in the path of said beam, rotating said optical wedge correction element until said beam is substantially aligned to illuminate said desired point on said target, and affixing said optical wedge element in place in said transmitter body.

8. The method of claim 7 in which the step of affixing said optical wedge element in place in said transmitter body comprises the step of adhesively affixing said optical wedge element in place.

9. The method of claim 7 in which the step of providing a plurality of optical wedge correction elements having varying wedge angles comprises the step of providing a plurality of optical wedge correction elements, each element having a generally cylindrical shape and defining flat first and second surfaces, the angles included between said first and second surfaces of said plurality of optical wedge correction elements varying from element to element.

10. The method of claim 7 in which the step of selecting an optical wedge correction element from said plurality of optical wedge correction elements includes the step of selecting an optical wedge correction element having a deflection angle appropriate to redirect the beam onto the desired point on the target.

11. The method of claim 7 in which the step of providing a plurality of optical wedge correction elements having varying wedge angles comprises the step of providing a plurality of optical wedge correction elements having deflection angles that are vary in increments of 0.25 minutes.

12. The method of claim 7 in which the step of positioning the transmitter and a beam target such that a properly calibrated beam will illuminate a desired point on the target includes the step of positioning the transmitter body by placing it in contact with reference surfaces.

* * * * *